United States Patent
Nowosielski et al.

[19]

[11] Patent Number: 6,121,555
[45] Date of Patent: Sep. 19, 2000

[54] FLUID CONTAINER SENSOR

[75] Inventors: Albert Nowosielski, Roselle, Ill.;
Russell Kuzelka, New Berlin, Wis.;
Charles Zander, Buffalo Grove, Ill.;
David Cho, Belvidere, Ill.; Raymond Jacobs, Wauconda, Ill.

[73] Assignee: Northgate Technologies Incorporated, Elgin, Ill.

[21] Appl. No.: 09/390,564

[22] Filed: Sep. 3, 1999

Related U.S. Application Data

[63] Continuation of application No. 08/948,913, Oct. 10, 1997.
[51] Int. Cl.[7] ........................... G01G 23/18; G01G 19/00
[52] U.S. Cl. ........................... 177/45; 177/225; 177/245; 600/580
[58] Field of Search ..................... 177/45, 46, 47, 177/48, 49, 225, 232, 245; 600/580, 581

[56] References Cited

U.S. PATENT DOCUMENTS

| | | | |
|---|---|---|---|
| 3,287,721 | 11/1966 | Baehr | 177/45 |
| 3,389,387 | 6/1968 | Hulse et al. | 177/45 |
| 4,176,349 | 11/1979 | Fliegel | 177/48 |
| 4,198,626 | 4/1980 | Rauscher | 177/45 |
| 4,931,777 | 6/1990 | Chiang | 177/46 |
| 5,112,319 | 5/1992 | Lai | 177/45 |

*Primary Examiner*—Randy W. Gibson
*Attorney, Agent, or Firm*—Brinks Hofer Gilson & Lione

[57] ABSTRACT

A fluid sensor apparatus for monitoring fluid in a container. The fluid sensor apparatus comprises a housing having an upper hook extending from a top thereof to allow the housing to be suspended. A lower hook is telescopically received in the housing and extends from a bottom thereof. The lower hook is adapted for suspending a fluid container therefrom. The lower hook is movable relative to the housing. A cam member is located inside the housing and is movable relative thereto. The cam member is coupled to an upper end of the lower hook. The cam member has a stepped gradation. A biasing member is coupled between a lower shoulder of the cam member and the housing. The biasing member is adapted to apply a force against the cam member to cause the cam member to be biased upward relative to the housing to an upper position. A switch is coupled to the housing and has an actuator located in relation to the stepped gradation of the cam member. The switch is in a first state when the cam member is in the upper position. The switch is in a second state when a load suspended from the lower hook overcomes the force of the biasing member causing the cam member to be moved to a lower position relative to the housing. An alarm coupled to the switch is operative to indicate a fluid condition when the switch is in one of the first and second states.

23 Claims, 3 Drawing Sheets

FLUID CONTAINER SENSOR

This application is a continuation of application Ser. No. 08/948,913, filed Oct. 10, 1997, (pending).

FIELD OF THE INVENTION

The present invention relates generally to a medical accessory for use with the delivery of a fluid to a patient or the collection of a fluid from a patient

BACKGROUND OF THE INVENTION

In hospitals, nursing homes, clinics, physician's offices or other medical facilities, it is often necessary to dispense fluids, such as sterile water, glycene, sorbital, saline and other irrigating solutions or other fluids or medicines to patients. A conventional way to dispense a fluid is to suspend a supply of the fluid in a bag or bottle above the patient, connect a length of tubing to an outlet of the fluid supply, and deliver the fluid to the patient via the tubing. By suspending the fluid supply above the patient, the fluid can be delivered to the patient at a desired pressure.

In some cases, the delivery of such fluids in this manner occurs over a period of several hours. In some situations, it is desired to monitor the delivery of the fluid so that the delivery of fluid can be stopped before the fluid runs low or so that a new supply of the fluid can be provided to maintain an uninterrupted flow to the patient. In some situations, the patient may experience undesirable effects if a fluid being delivered runs low or even runs out before a nurse or other medical attendant detects the condition. These undesirable effects can include clotting, dehydration, improper medication dosage, and so on.

Fluid collection from patients includes similar concerns. Fluids, such as urine, are sometimes withdrawn from a patient via a tubing positioned in the patient's bladder and collected in a container into which the tubing drains. If a container collecting the fluid becomes full without being noticed, the fluid may cease to be eliminated and distention or infection in the patient may occur.

In many cases, monitoring of fluid delivery to or drainage from patient is performed by having a medical attendant check on the patient on a regular basis until the need to change the fluid is observed. This type of monitoring requirement may impose demands on the time and attention of the medical attendant. Accordingly, it would be advantageous to provide a way to conveniently monitor fluid being delivered to or being collected from a patient.

SUMMARY OF THE INVENTION

The subject matter disclosed herein relates generally to a safety device for use in hospitals, nursing homes or other locations where the dispensing of fluids to or the collection of fluids from patients takes place. The safety device is a fluid sensor apparatus for monitoring fluid in a container. In the case of fluid delivery, the fluid container holds a supply of a fluid to be delivered to the patient, for example, bags of saline. In the case of fluid collection, the container may be a drainage bag.

The fluid sensor apparatus comprises a housing having an upper hook extending from a top thereof to allow the housing to be suspended. A lower hook is telescopically received in the housing and extends from a bottom thereof. The lower hook is adapted for suspending a fluid container therefrom. The lower hook is movable relative to the upper hook. A cam member is located inside the housing and is movable relative thereto. The cam member is coupled to an upper end of the lower hook. A biasing member is coupled between a lower shoulder of the cam member and the housing. The biasing member is adapted to apply a force against the cam member to cause the cam member to be biased upward relative to the housing to an upper position. A switch is coupled to the housing and has an actuator located in relation to the cam member such that the switch is in a first state when the cam member is in the upper position. The switch is in a second state when a load suspended from the lower hook overcomes the force of the biasing member causing the cam member to be moved to a lower position relative to the housing. An alarm coupled to the switch is operative to indicate a low fluid condition when the switch is in the first state. The alarm may be an audible alarm, a visual alarm, or both.

According to a preferred aspect, the fluid sensor apparatus has an internal power source, e.g. batteries, that operate the alarm. Thus, the fluid sensor is self-contained.

BRIEF DESCRIPTION OF THE DRAWINGS

FIG. 5 is a side view of the fluid sensor of FIG. 1 showing the user panel.

FIG. 6 is a circuit diagram of the fluid sensor of FIG. 1.

DETAILED DESCRIPTION OF THE PRESENTLY PREFERRED EMBODIMENTS

Figure 1:
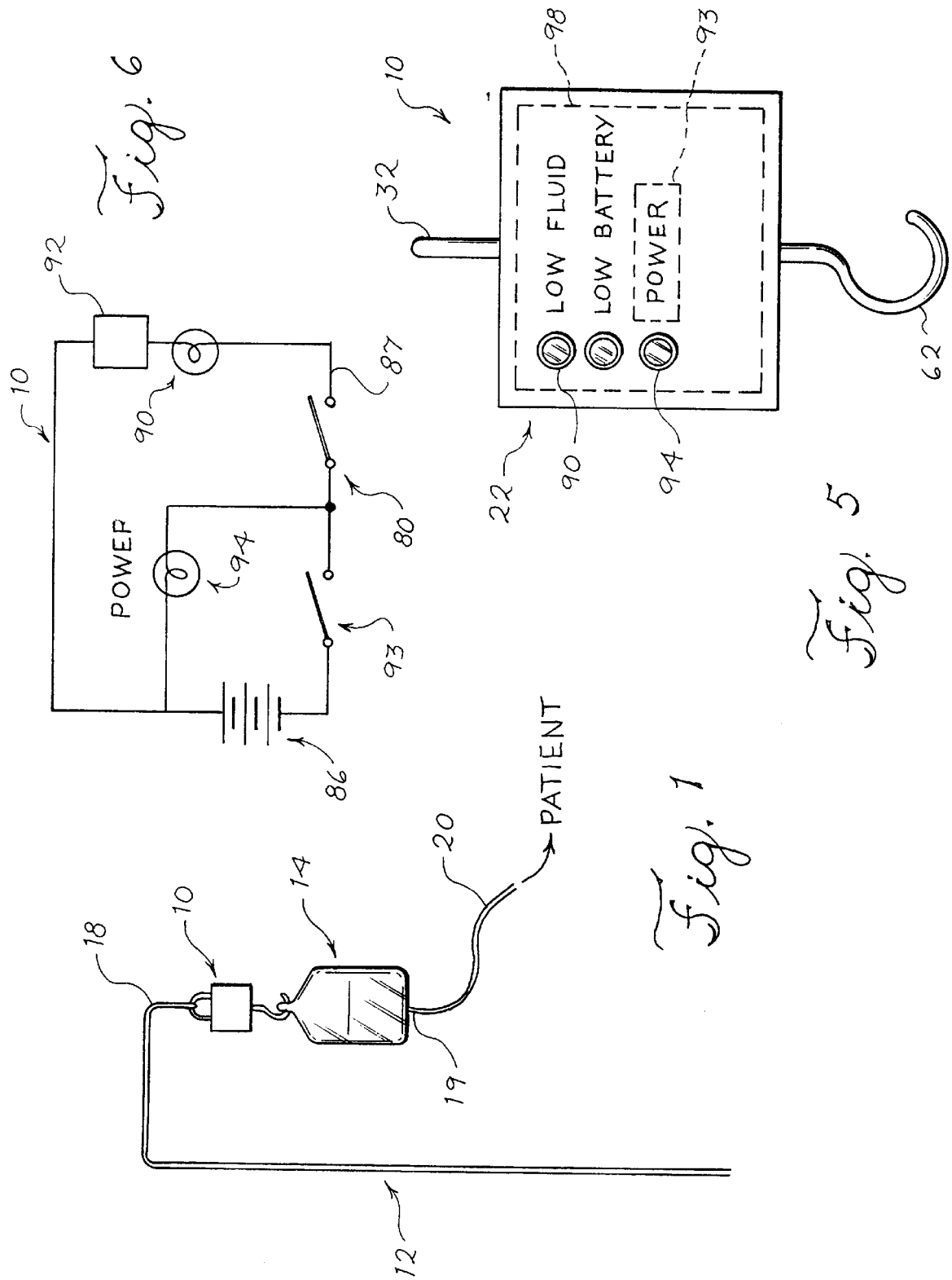
FIG. 1 is an illustration of a first embodiment of the fluid sensor coupled between an IV pole and fluid bag.

Referring to FIG. 1, a first embodiment of a fluid container sensor apparatus 10 for monitoring the weight of a fluid is disclosed. The fluid container sensor apparatus 10 is used in connection with a suitable structure for suspending fluids, such as an IV pole 12, and a supply of fluid 14. In this embodiment, the supply of fluid 14 is a bag of saline. The fluid container sensor apparatus 10 is connected between an arm 18 of the IV pole 12 and the supply of fluid 14 so that the full weight of the supply of fluid 14 is carried by the fluid container sensor apparatus 10. Appropriate tubing 20 is connected to an outlet 19 of the supply of fluid 14 and leads to a patient (not shown).

Figure 2:
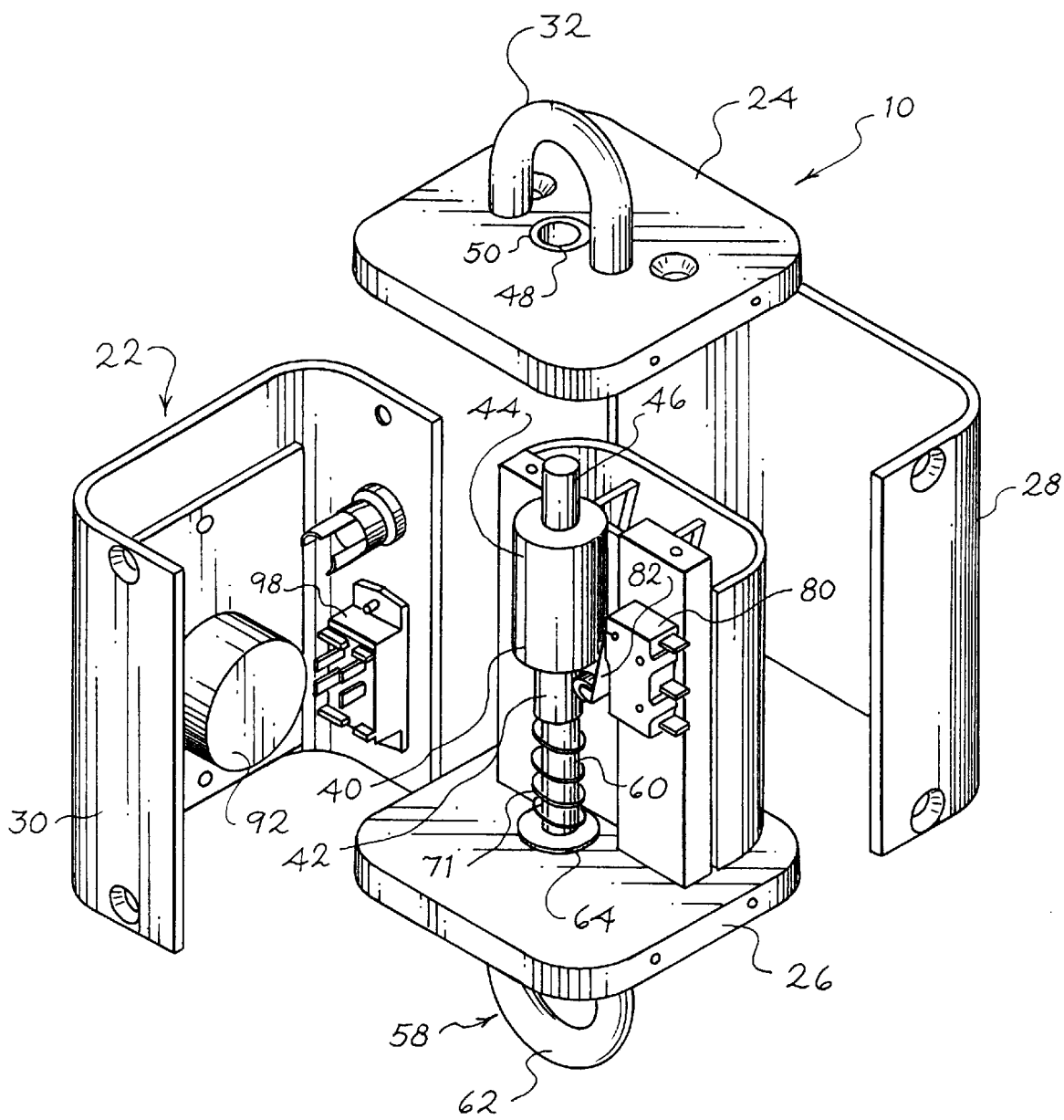
FIG. 2 is an exploded view of the fluid sensor of FIG. 1.

Referring to FIG. 2, there is an exploded view of the fluid container sensor apparatus 10. The fluid container sensor apparatus 10 includes a housing 22. The housing 22 is comprised of a top wall 24, a bottom wall 26, and first and second side walls, 28 and 30. Located on a top side of the top wall 24 is an upper hook 32. The upper hook 32 is suitable for coupling to the arm 18 of the IV pole 12, as shown in FIG. 1.

A cam 40 is located inside the housing 22. The cam 40 includes at least one stepped gradation. In the embodiment, the stepped gradation of the cam 40 is formed by a first cylindrical portion 42 having a first diameter and a second cylindrical portion 44 having a second diameter. The cam 40 also includes a third cylindrical portion 46 having a third diameter. The cam 40 is oriented vertically in the housing 22 so that the first cylindrical portion 42 is lowest, the third cylindrical portion 46 is highest, and the second cylindrical portion 44 is between the first and third cylindrical portions. The diameter of the second cylindrical portion 44 is greater than the diameter of the first cylindrical portion 42 and the third cylindrical portion 46. The diameter of the first cylindrical portion is 0.290 inches, the diameter of the second cylindrical portion 44 is 0.625 inches, and the diameter of the third cylindrical portion 46 is 0.249 inches.

Located in the top wall 24 is an opening 48 in which is located a bushing 50. The bushing 50 has an ID of 0.252 inches and receives the third cylindrical portion 46 of the cam 40. The sizes of the third cylindrical portion 46 and the bushing ID are selected so that the cam 40 can slide relatively freely through the bushing 50.

Figures 3, 4:
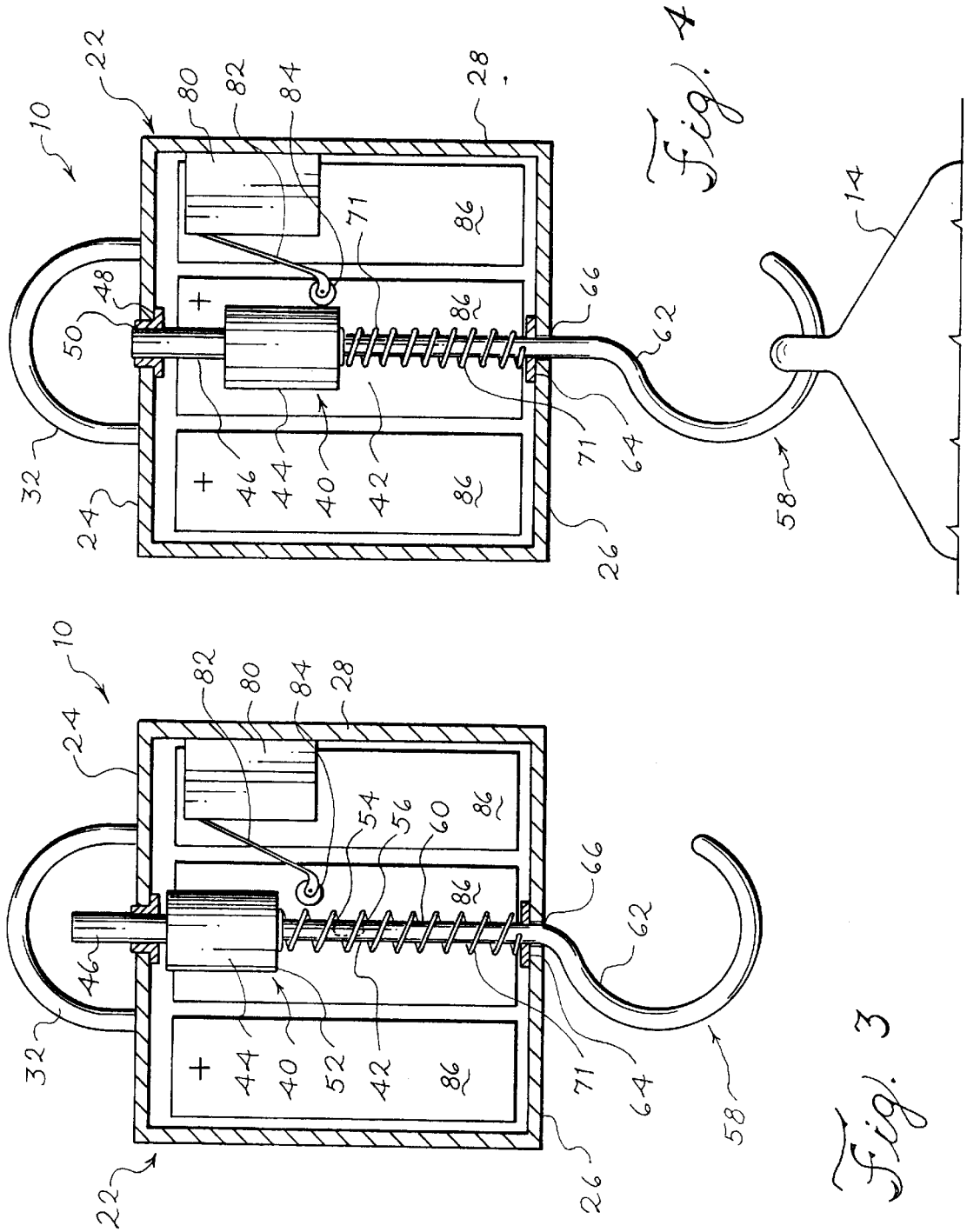
FIG. 3 is a sectional view of the fluid sensor of FIG. 1 in an unloaded state.
FIG. 4 is a sectional view of the fluid sensor of FIG. 1 in an unloaded state.

As best seen in FIG. 3, located in the bottom end 52 of the cam 40 is a threaded bore 54. Received in the threaded bore 54 is a threaded shaft 56 of a bottom hook 58. The bottom hook 58 includes a shaft portion 60 and a hook portion 62. The shaft portion 60 is relatively straight and located inside the housing 22 extending downward from the bottom 52 of the cam 40. The hook portion 62 is located outside the housing 12, specifically below the bottom wall 26. The shaft portion 60 extends through a bushing 64 located in an opening 66 located in the bottom wall 26 of the housing 22.

A biasing device, such as a spring 71, is located around the shaft portion 60 of the bottom hook 58. The spring 71 bears against an upper shoulder 73 formed by a bottom wall of the second portion 44 of the cam 40 and a lower shoulder formed by the inside of the bottom wall 26 of the housing 22. When the fluid container sensor apparatus 10 is assembled and unloaded (or minimally loaded), the spring 71 is under compression and biases the cam 40 upward relative to the housing 22. This state of the fluid container sensor apparatus 10 is shown in FIG. 3. In a present embodiment, the spring 71 has a spring constant of 2.7 lb./in.

Located within the housing 22 is a microswitch 80. The microswitch 80 is mounted on the inside of one of the side walls 28 of the housing 22. The microswitch 80 includes a biased leaf actuator arm 82. Located at the end of the actuator arm 82 is a cam follower or roller 84. The microswitch 80 is positioned so that the actuator arm 82 is unloaded and adjacent to, but not touching, the spring 71 and the first portion 42 (as in FIG. 3). When the spring 71 is loaded (as in FIG. 4), the roller 84 of the actuator arm 82 bears on the second portion 44 of the cam 40. When the roller 84 bears on the second portion 44 of the cam 40, it is deflected from an 11 outward, at-rest position to an inward, compressed position.

Referring to FIG. 6, a suitable self-contained power source, such as batteries 86, is in a circuit 87 with a low fluid visual indicator 90 and/or an audible alarm 92. An on/off switch 93 connects the power source 86 to the microswitch 80. A power indicator 94 is coupled to the on/off switch 93 to provide a visual indication that the fluid sensor 10 has been switched on. The microswitch 80 is coupled to the on/off switch 93 and a low fluid visual indicator 90 and/or an audible alarm 92. Referring to FIG. 5, the on/off switch 93, the low fluid visual indicator 90, and the power indicator may be located on a user control panel 98 located on an outside of one of the side walls of the housing 22.

In one embodiment, the microswitch 80 is an Omron model SS-5GL2. The audible alarm 92 is a Mulata Erie, PKB24 SPC-3601 alarm. The low fluid visual indicator 90 is a light such as a Hewlett Packard HLMP-1700 lamp. In one embodiment, three AA batteries are used.
Operation.

To use the fluid container sensor apparatus 10, the housing 12 is coupled between the arm 18 of the IV pole 12 and the supply of fluid 14. The upper hook 32 is coupled to the arm 18 of the IV pole 12. From the lower hook 62, the supply of fluid 14 is suspended. Thus, the fluid container sensor apparatus 10 is coupled so that the fluid supply 14 is suspended from the fluid container sensor apparatus 10 while the fluid container sensor apparatus 10 is suspended from the IV pole arm 18. In this condition, with the fluid bag full, the weight of the fluid causes the cam 40 to be slid telescopically downward relative to the housing 22 so that it assumes the position shown in FIG. 4. In this position, the roller 84 of the microswitch 80 is located on the second cylindrical portion 44 of the cam 40. This portion 44 has a larger diameter than the first portion 42 thereby causing the arm 82 of the microswitch 80 to be actuated to a first state. An on/off button 93 on the input panel 88 is operated to supply power to the switch 80 from the batteries 86 (as shown in the diagram of FIG. 6). When the microswitch 80 is in the first state, the power indicator 94 on the user panel 98 is lit showing that the fluid container sensor apparatus 10 is activated and operational, however, when the microswitch 80 is in the first state, the audible alarm 92 is not sounded and the alarm light 90 is not lit.

As the fluid in the bag is delivered to the patient, the weight of the bag decreases. Eventually, the weight of the bag is low enough so that it is insufficient to counter the biasing force of the spring 71. When the force of the spring is sufficient to overcome the weight of the fluid remaining in the fluid supply bag, the cam 40 is moved upwards to the position shown in FIG. 3. In this position, the roller 84 of the microswitch 80 is adjacent to, but not touching, the spring 71 and the first cylindrical portion 42 of the cam 40. Because this portion of the cam has a smaller diameter than the second portion 44, the arm 82 moves to a second position causing the microswitch 80 to be in a second state. This change in state of the switch 80 causes the low fluid light 90 to be lit and causes the alarm 92 to be sounded.

In a preferred embodiment, the fluid container sensor is battery operated with up to 400 recharge cycles. Preferably, the fluid container sensor provides both a visual indicator and an audible alarm. Alternatively, the fluid container sensor can be designed with an RF signal transmitter that can signal a central location, such as a nurse's station, for remote monitoring. In the embodiment shown in the figures, the fluid container sensor provides both visual and audible alarms if the fluid level of a 1 liter bag is less than 400 ml of sterile water or below 400 ml in a 3 liter bag of sterile water. Alternate versions can be designed for different volume containers, different alarm points, and/or liquids with different specific gravities.

In an alterative embodiment, the fluid container apparatus may be used to monitor fluid collection. As mentioned above, when fluid is being collected from a patient it is sometimes important to know when the collection container is full so that it can be emptied or changed. In an alternative embodiment of the fluid container sensor apparatus, the alarms can be operated upon detection of a full container condition, instead of an empty container condition. In such an alternative embodiment, the collection container is located relatively lower than the patient so that fluid drains into the collection container from the patient. The collection container is suspended from the alternative embodiment of the fluid container sensor apparatus which in turn is suspended from a suitably low arm of a pole. In this alternative embodiment, the operation of the microswitch 80 is reversed so that movement of the cam member to the upper position relative to the housing (i.e., the roller 84 is not on the larger diameter second portion 44 of the cam member 40) causes the alarm to sound. In other respects, the fluid sensor container apparatus for monitoring fluid collection can be similar to the embodiment described above for monitoring fluid delivery.

The device described above provides a simple and inexpensive means for alerting medical staff or the patient and can easily be adapted to current hospital or clinical equipment, such as IV poles, bags, bottle hangers and so on. The device can be permanent, semi-reusable, or completely disposable, based upon need and cost considerations.

It is intended that the foregoing detailed description be regarded as illustrative rather than limiting and that it is understood that the following claims including all equivalents are intended to define the scope of the invention.

We claim:

1. A sensor for medical monitoring of a fluid in a container coupled to a patient, the sensor comprising:
   a) an upper hook;
   b) a lower hook coupled to the upper hook and movable in relation thereto, the lower hood adapted for suspending a fluid container therefrom;
   c) a cam member fixedly coupled to one of the hooks and movable in relation to the other of the hooks;
   d) a biasing member coupled between the hooks;
   e) a cam follower attached to a first switch, the cam follower being movably disposed with respect to the cam member to cause the first switch to be in a first state when the lower hook is unloaded and to be in a second state when the lower hook is sufficiently loaded to overcome the biasing member; and
   f) an alarm coupled to the first switch and operative to indicate a fluid condition when the switch is in one of the states but not the other.

2. The invention of claim 1 wherein said alarm is an audible alarm.

3. The invention of claim 1 wherein said alarm is a visual alarm.

4. The invention of claim 1 further comprising a battery electrically coupled to said alarm and said first switch.

5. The invention of claim 1 further comprising an on/off switch in series with said first switch.

6. The invention of claim 1 wherein said first switch includes a leaf arm that bears on said cam member when said first switch is in one of said states but does not bear on said cam member when in the other of said states.

7. The invention of claim 1 wherein said first switch comprises a leaf arm and further comprising:
   a roller rotatably mounted on an end of said leaf arm, said roller bearing on said cam member.

8. The invention of claim 1 wherein said alarm comprises an audible alarm and a visual alarm.

9. A medical fluid sensor for monitoring weight of a fluid in a container, comprising:
   a) a housing;
   b) an upper hook coupled to the housing adapted for suspending the housing therefrom;
   c) a lower hook telescopically received in the housing and extending from a bottom thereof, the lower hook adapted for suspending a fluid container therefrom, the lower hook being movable relative to the housing;
   d) a cam member located inside the housing and movable relative thereto, the cam member being coupled to an upper end of the lower hook, and the cam member having a steppe gradation;
   e) a biasing member coupled between a lower shoulder of the cam member and a shoulder coupled to the housing, the biasing member adapted to apply a force against the lower shoulder of the cam member to cause the cam member to be biased upward relative to the housing to an upper position relative thereto;
   f) a first switch coupled to the housing and having a cam follower movably disposed with respect to the stepped gradation on the cam member to cause the switch to be in a first state when the cam member is in the upper position and to be in a second state when a load suspended from the lower hook overcomes the force of the biasing member causing the cam member to be moved to a lower position relative to the housing; and
   g) an alarm coupled to the switch operative to indicate a fluid condition when the first switch is in one of the states and not the other.

10. The invention of claim 9 wherein said alarm is an audible alarm.

11. The invention of claim 9 wherein said alarm is a visual alarm.

12. The invention of claim 9 further comprising a battery electrically coupled to said alarm and said first switch.

13. The invention of claim 9 further comprising an on/off switch in series with said first switch.

14. The invention of claim 9 wherein the cam follower comprises
    a roller rotatably mounted on an end of a leaf arm attached to the switch, said roller bearing on said cam member.

15. The invention of claim 9 wherein said alarm comprises an audible alarm and a visual alarm.

16. The invention of claim 9 further comprising a battery located inside said housing and electrically coupled to said alarm and said first switch.

17. A self-contained battery-operated fluid sensor for monitoring weight of a fluid in a container, comprising:
    a) a housing;
    b) an upper hook extending from a top of the housing;
    c) a lower hook received in the housing and extending from a bottom thereof, the lower hook adapted for suspending a fluid supply therefrom, the lower hook being movable vertically relative to the housing;
    d) a cam member located inside the housing and coupled to an upper end of the lower hook, the cam member being movable with the lower hook relative to the housing, thereto, and the cam member having a stepped gradation;
    e) a biasing member coupled between a lower shoulder of the cam member and a shoulder coupled to the housing, the biasing member adapted to apply a force against the lower shoulder of the cam member to cause the cam member to be biased upward relative to the housing to an upper position relative thereto;
    f) a first switch coupled to the housing and having a cam follower movably disposed with respect to the stepped gradation on the cam member to cause the first switch to be in a first state when the cam member is in the upper position and to be in a second state when a load suspended from the lower hook overcomes the force of the biasing member causing the cam member to be moved to a lower position relative to the housing;
    g) a battery electrically coupled to the first switch; and
    h) an alarm coupled the first switch to receive power from the battery upon operation of the first switch to indicate a fluid condition when the first switch is in one of the first and second states.

18. The invention of claim 17 wherein said fluid condition is a low fluid condition.

19. The invention of claim 17 wherein said fluid condition is a high fluid condition.

20. A sensor for medical monitoring of fluid in a container, the sensor comprising:
   a) a housing;
   b) a switch;
   c) a cam member disposed within the housing and movable between a first position and a second position;
   d) a hook connected to one of the housing and the cam member, the hook being adapted to receive a container for holding medical fluid;
   e) a biasing member to bias the cam member in the first position; and
   f) a cam follower movably disposed with respect to the cam member and positioned with respect to the switch so that when the cam member is in the first position the cam follower causes the switch to be in a first state and when the cam member is in the second position the cam follower causes the switch to be in a second state.

21. A sensor for medical monitoring of a fluid in a container coupled to a patient, the sensor comprising:
   a) an upper hook;
   b) a lower hook coupled to the upper hook and movable in relation thereto, the lower hook adapted for suspending a fluid container therefrom;
   c) a cam member fixedly coupled to one of the hooks and movable in relation to the other of the hooks;
   d) a biasing member positioned below the cam member and coupled between the hooks;
   e) a first switch positioned below the cam member and coupled adjacent the cam member and bearing thereagainst to cause the first switch to be in a first state when the lower hook is unloaded and to be in a second state when the lower hook is sufficiently loaded to overcome the biasing member; and
   f) an alarm coupled to the first switch and operative to indicate a fluid condition when the switch is in one of the states but not the other.

22. A medical fluid sensor for monitoring weight of a fluid in a container, comprising:
   a) a housing;
   b) an upper hook coupled to the housing adapted for suspending the housing therefrom;
   c) a lower hook telescopically received in the housing and extending from a bottom thereof, the lower hook adapted for suspending a fluid container therefrom, the lower hook movable relative to the housing;
   d) a cam member located inside the housing and movable relative thereto, the cam member coupled to an upper end of the lower hook, and the cam member having a stepped gradation;
   e) a biasing member positioned below the cam member and coupled between a lower shoulder of the cam member and the housing, the biasing member adapted to apply a force against the lower shoulder of the cam member to cause the cam member to be biased upward relative to the housing to an upper position relative thereto;
   f) a first switch positioned below the cam member and coupled to the housing and having a switch actuator located in relation to the stepped gradation on the cam member to cause the switch to be in a first state when the cam member is in the upper position and to be in a second state when a load suspended from the lower hook overcomes the force of the biasing member causing the cam member to be moved to a lower position relative to the housing; and
   g) an alarm coupled to the switch operative to indicate a fluid condition when the first switch is in one of the states and not the other.

23. A self-contained batter-operated fluid sensor for monitoring weight of a fluid in a container, comprising:
   a) a housing;
   b) an upper hook extending from a top of the housing;
   c) a lower hook received in the housing and extending from a bottom thereof, the lower hook adapted for suspending a fluid supply therefrom, the lower hook being movable vertically relative to the housing;
   d) a cam member located inside the housing and coupled to an upper end of the lower hook, the cam member being movable with the lower hook relative to the housing, thereto, and the cam member having a stepped gradation;
   e) a biasing member positioned below the cam member and coupled between a lower shoulder of the cam member and a shoulder coupled to the housing, the biasing member adapted to apply a force against the lower shoulder of the cam member to cause the cam member to be biased upward relative to the housing to an upper position relative thereto;
   f) a first switch positioned below the cam member and coupled to the housing and having a switch actuator located in relation to the stepped gradation on the cam member to cause the switch to be in a first state when the cam member is in the upper position and to be in a second state when a load suspended from the lower hook overcomes the force of the biasing member causing the cam member to be moved to a lower position relative to the housing;
   g) a battery electrically coupled to the first switch; and
   h) an alarm coupled to the first switch to receive power from the battery upon operation of the first switch to indicate a fluid condition when the first switch is in one of the first and second states.

* * * * *

UNITED STATES PATENT AND TRADEMARK OFFICE
CERTIFICATE OF CORRECTION

PATENT NO. : 6,121,555
DATED : September 19, 2000
INVENTOR(S) : Albert Nowosielski et al.

It is certified that error appears in the above-identified patent and that said Letters Patent is hereby corrected as shown below:

Claim 1,
Line 5, change "hood" to -- hook --.

Claim 9,
Line 13, change "steppe" to -- stepped --.

Claim 14,
Line 2, after "comprises" insert -- : --.

Claim 17,
Line 29, change "coupled the" to -- coupled to the --.

Claim 23,
Line 1, change "batter" to -- battery --.

Signed and Sealed this

Sixth Day of November, 2001

Attest:

NICHOLAS P. GODICI
Attesting Officer
Acting Director of the United States Patent and Trademark Office